Oct. 21, 1958 L. D. GIBSON 2,857,584
SAFETY MECHANISM FOR HYDRAULIC BRAKING SYSTEMS
Filed Nov. 14, 1956 2 Sheets-Sheet 1
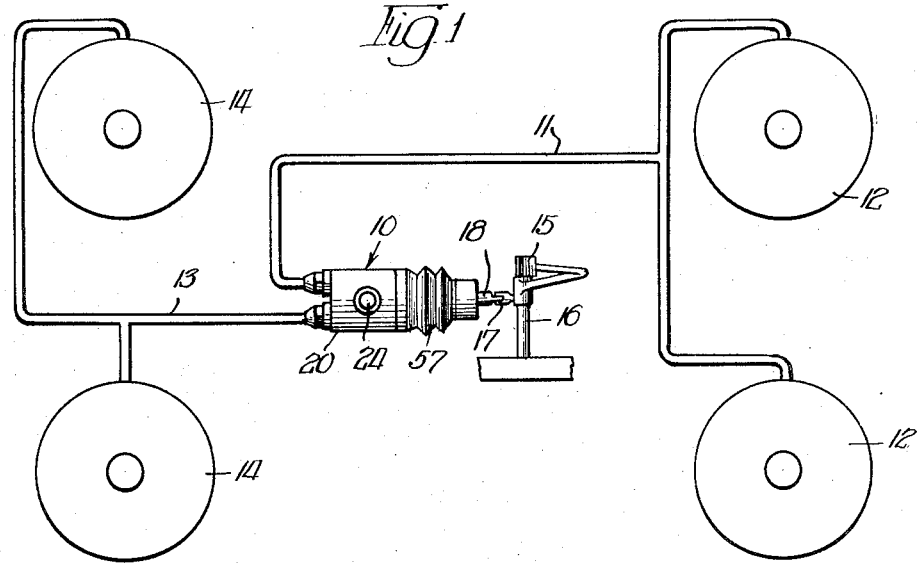
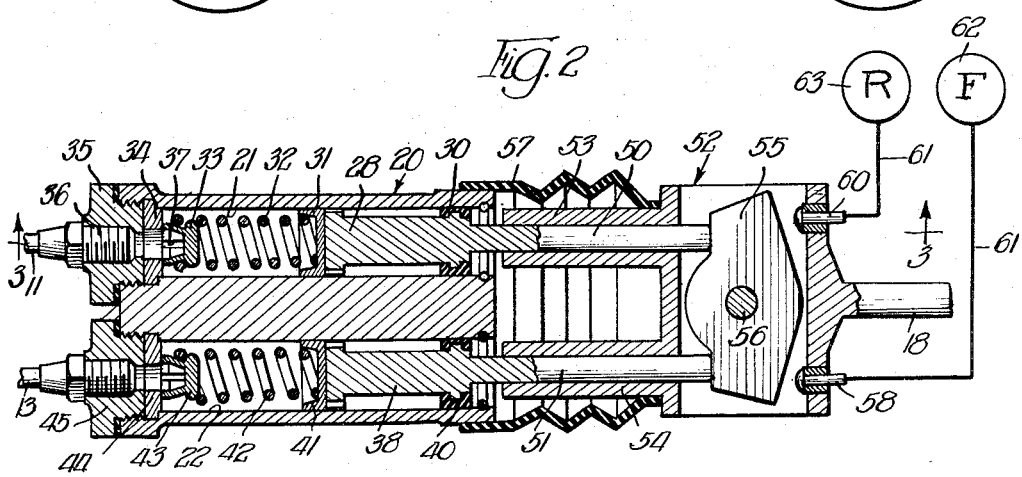
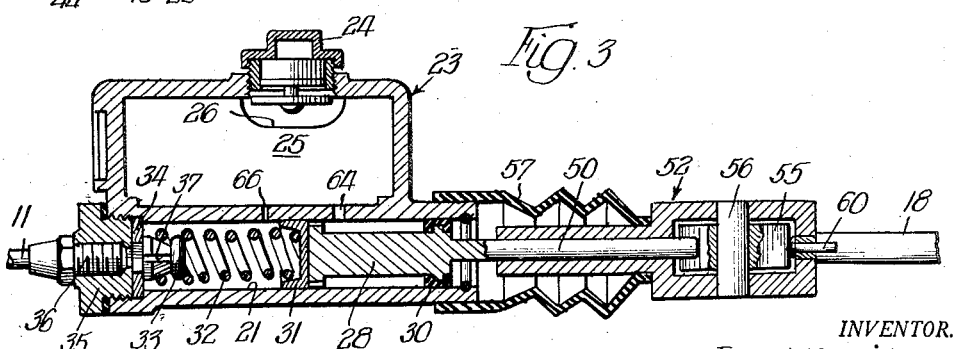
INVENTOR.
Levi D. Gibson,
BY Oct. 21, 1958   L. D. GIBSON   2,857,584
SAFETY MECHANISM FOR HYDRAULIC BRAKING SYSTEMS
Filed Nov. 14, 1956   2 Sheets-Sheet 2
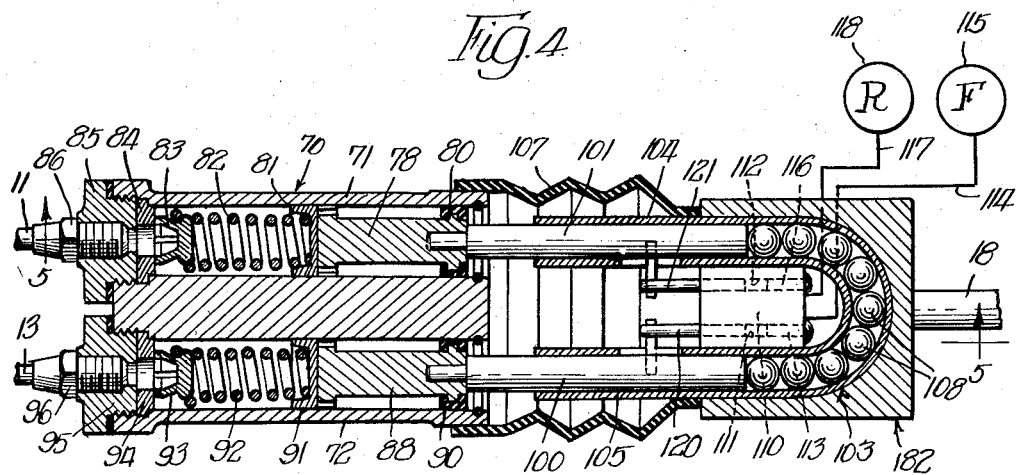
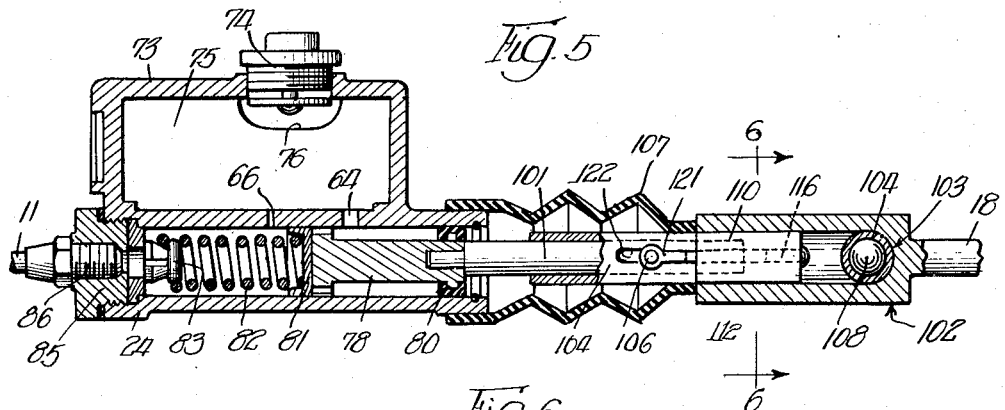
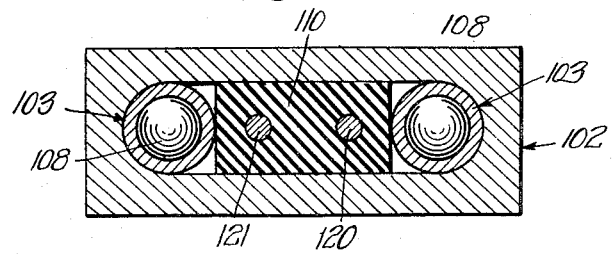
INVENTOR.
Levi D. Gibson,
BY

United States Patent Office 2,857,584
Patented Oct. 21, 1958

2,857,584

SAFETY MECHANISM FOR HYDRAULIC BRAKING SYSTEMS

Levi D. Gibson, Baxter Springs, Kans., assignor to Sekesco Company, Incorporated, Pittsburg, Kans., a corporation of Kansas Application November 14, 1956, Serial No. 622,092

5 Claims. (Cl. 340—60)

The invention relates to hydraulic pressure systems for controlling the brake mechanisms of automotive vehicles and other types of equipment employing braking mechanisms and has reference in particular to new and novel improvements in hydraulic pressure systems of this type.

The primary object of the present invention is to provide an hydraulic pressure system whereby a pair of power cylinders may be actuated by at least one actuating means to produce hydraulic pressure for application, respectively, to the front and rear brakes of an automobile, and wherein the power cylinders will have signalling means associated therewith to warn the operator of any impending failure in the system leading to either the front or rear brakes.

Another object is to provide a dual pressure system for the front and rear wheel brakes, respectively, of an automobile whereby should a fluid leak occur in one system, the other system will remain unaffected and will be operative to provide its corresponding portion of the total braking power for maintaining control of the automobile.

Another object is to provide an hydraulic braking system of the character described which will be substantially failure-proof but should leakage of the fluid occur for any reason the operator will be warned by a signal light on the dashboard and which will selectively indicate the cause of the trouble as in either the front or rear wheel brake systems.

A further object is to provide an hydraulic braking system for automobiles and the like which will employ dual master cylinders cast integral with a central safety reservoir, with one cylinder supplying hydraulic pressure to the front wheel brakes and the other cylinder supplying hydraulic pressure to the rear wheel brakes, and wherein pressure equilibrium is maintained as regards the cylinders by means of an equalizer bar.

Another object resides in the provision of dual master cylinders having hydraulic connection with the front and rear brake systems, respectively, wherein the dual master cylinders each have a piston operating therein and which can be simultaneously actuated by the operator for applying the brakes, and wherein said actuation will take place through a pivoted equalizer bar in combination with reciprocable piston rods, the said rods operatively connecting the bar on respective sides thereof with the pistons of the cylinders.

Another object of the invention resides in the provision of a master cylinder unit having a pair of hydraulic cylinders and having a reservoir for each cylinder in associated relation therewith and wherein openings are provided in the wall of each cylinder forming passages leading to its respective reservoir, the said openings being located on opposite sides of the piston when the piston is located in its retracted, inoperative position of rest.

With these and various other objects in view, the invention may consist of certain novel features of construction and operation as will be more fully described and particularly pointed out in the specification, drawings and claims appended hereto.

In the drawings which illustrate an embodiment of the invention, and wherein like reference characters are used to designate like parts—

Figure 1 is a diagrammatic view of an hydraulic pressure system incorporating the dual master cylinder unit of the present invention, the system being shown as applied to the front and rear wheel brakes of an automotive vehicle for actuating the brakes thereof;

Figure 2 is a longitudinal, sectional view taken substantially through the center of the dual master cylinder unit showing the power cylinders thereof, the reciprocable piston rods and the equalizer bar;

Figure 3 is a longitudinal, sectional view taken substantially along line 3—3 of Figure 2 and which illustrates in particular the reservoir structure constituting part of the dual master cylinder unit;

Figure 4 is a longitudinal, sectional view taken substantially through the center of the dual master cylinder unit showing a modified form of the invention;

Figure 5 is a longitudinal sectional view taken substantially along line 5—5 of Figure 4; and Figure 6 is an enlarged transverse sectional view taken substantially along line 6—6 of Figure 5.

Referring more particularly to the drawings, Figure 1 illustrates an embodiment of the hydraulic pressure system of the invention and which is shown as applied to an automotive vehicle having the front and rear brakes thereof operated by the system, although it is understood that the invention as hereinafter described may have many uses other than in connection with hydraulic brakes of an automobile.

The numeral 10 indicates generally the dual power cylinder which has hydraulic connection through the conduit 11 with the hydraulic brakes of the front wheels 12 and a second conduit, namely, 13, leads from the unit 10 for connecting the same with the hydraulic brakes of the rear wheels 14. The dual power cylinder unit is actuated by the operator through the foot pedal 15, or the like, suitably fixed to the shaft 16 and which has connection at 17 to the rearwardly extending stud 18 of said unit. Through actuation of the foot pedal 15 in a downward direction it will be understood that the dual power cylinder unit is responsively actuated so that pressure is applied to the fluid in the respective conduits 11 and 13 to apply the brakes to the front and rear wheels. Since both power cylinders of the unit 10 are actuated together, it will be understood that the hydraulic system is operative to apply the front wheel brakes and the rear wheel brakes simultaneously. However, should a fluid leak occur with respect to either system, the remaining system will not be adversely affected and accordingly said remaining system will be operative to provide its corresponding portion of the total braking power for maintaining control of the vehicle. Also, in accordance with the invention a dashboard light will be illuminated, thereby signalling to the operator that failure has occurred in the braking system of the vehicle and said light will selectively indicate the failure as in either the front or rear systems.

Referring to Figures 2 and 3, which disclose details of the dual power cylinder unit, it will be observed that the unit essentially consists of a casting generally indicated by numeral 20 and which provides power cylinder 21 and power cylinder 22, the said cylinders being located relatively close together in side by side relation and having suitably associated therewith the single reservoir 23, which reservoir continuously supplies both power cylinders with hydraulic fluid. The cap 24 is removable from reservoir 23 for replenishing the oil or other fluid contained in the reservoir and within the reservoir there is located the partition 25 having a cut-away portion such as 26 adjacent cap 24. In the event either the front or the rear wheel brakes should fail, or should a fluid leak occur in the conduit connections 11 or 13, or should leakage occur in either of the power cylinders 21 and 22, the reservoir 23 is constructed and arranged to maintain a safe level as a reserve, whereby to assure proper operation of the remaining unaffected power cylinder and its related connecting conduit and wheel brakes.

A piston 28 is located within power cylinder 21, the said piston being mounted for free reciprocating movement within the power cylinder and for hydraulic sealing purposes said piston at its forward end is provided with a sealing ring such as 30 which may be described as carried by the piston or piston rod thereof and which may be formed of synthetic rubber, plastic or other suitable material, such as may seal this end of the cylinder unit against the leakage of hydraulic fluid. The rear end of the piston 28 is provided with the flexible cup 31 which likewise may be of any flexible sealing material such as leather, rubber, plastic or the like. The cup 31 additionally provides a seat for one end of the coil spring 32 which is suitably positioned at its other end by means of the member 33. This rear end of the power cylinder is suitably sealed by means of the washer 34 which supports the spring seat member 33 and is retained in place by means of the threaded closure member 35 to which conduit 11 is releasably secured by means of the nipple 36. The piston 38, having location within power cylinder 22, is similar in construction and mode of operation to piston 28 as above described. The forward end of the piston is sealed with respect to the cylinder 22 by the flexible washer 40 and said piston at its rear end is provided with the cup 41 of leather, rubber, plastic or the like, and which also provides a seat for the coil spring 42, the opposite end of the spring being positioned by member 43. This rear end of the power cylinder 22 is sealed by washer 44 retained in place by the threaded closure member 45 to which is releasably secured the nipple 46 for connecting thereto the conduit 13.

The spring seat members 33 and 43 for the cylinders respectively are slotted to provide openings 37 which permit the free flow of the hydraulic medium between the cylinder and its connecting conduit. The coil springs 32 and 42 tension the pistons by applying a yielding pressure thereto and which tends to maintain the pistons in an extreme forward position. The piston stroke takes place from this most forward position and said stroke is thus in a rearward direction to compress the hydraulic medium located rearwardly of the piston and actuate the brake system connecting with the particular cylinder.

The pistons 28 and 38 are each provided with a forwardly extending piston rod such as 50 and 51 which may be suitably secured to its piston by being cast integral therewith or by being welded thereto. The member or carriage 52 is provided with the tubes or sleeves 53 and 54 formed integral therewith and which receive the piston rods 50 and 51 so as to have telescoping relation with the piston rods and by reason of this mounting which the tubes have on the piston rods the member 52 is carried in a reciprocable manner, the reciprocations thereof being imparted to the pistons to produce the necessary actuation of the pistons for applying the front and rear wheel brakes. The piston rods 50 and 51 extend through the tubes 53 and 54, respectively, to project within the passage provided in member 52 and thus the piston rods terminate relatively adjacent the respective sides of the equalizer bar 55. Said bar is pivoted at 56 to member 52 and its respective side portions have flat areas for contact with its adjacent piston rod. The numeral 57 indicates a flexible boot or covering for the piston rods and tubes, one end of the boot connecting with casting 20 and the other end having connection with the movable member 52. It was previously explained that the rearwardly extending stud 18 connects with the foot pedal 15 which is adapted to be actuated by the operator for applying the brakes. As best shown in Figure 2, it will be seen that the stud 18 is integral with member 52 and through said stud the member 52 is reciprocated to reciprocate the pistons as has been explained.

The carriage member 52 is provided with the electric terminals 58 and 60 which are suitably insulated from the member and electrically connected by conductors 61 to signal lights such as 62 and 63. The signal light 62 for the front wheel brakes is illuminated when the equalizer bar 55 makes contact with terminal 58, said coaction of the parts taking place only in the event a fluid leak should occur in the front hydraulic brakes or in the connecting conduit 11 and power cylinder 21. In a similar manner the signal light 63 for the rear wheel brakes is illuminated when the equalizer bar makes contact with terminal 60. Said contact between the bar and the terminal 60 will occur only in the event a fluid leak should develop in the brakes of the rear wheel or in the connecting conduit 13 or power cylinder 22. Thus, should failure occur in either of the hydraulic systems for the front or rear wheel brakes the hydraulic pressure will become unbalanced as regards the power cylinder unit and said unbalancing of the equalizer bar 55 is effective to close the electric circuit to one or the other of the signal lights on the dashboard. Thus the operator is immediately notified not only as to the failure but as to which brake system wherein failure may have occurred.

For applying the brake of the automobile equipped with the present power cylinder unit the pedal 15 is depressed as would be the case with conventional systems and the rotation of shaft 16 is such that the carriage member 52 is moved toward the left. The pistons 28 and 38 are also moved in a left hand direction and pressure on the fluid such as oil in the brake cylinders 21 and 22 is intensified for applying the brakes. In normal operation with both front and rear wheel brake systems functioning in an effective manner the back pressure on the equalizer bar 55, by reason of its contact with the piston rods 50 and 51, will be equal and the equalizer bar will maintain its balanced position so that the the signal lights are not illuminated. However, as explained, should a leak develop in either system, it will be readily seen that the equalizer bar will assume an unbalanced position when the brakes are applied and accordingly either signal light 62 or 63 will be illuminated.

The reservoir 23 is also responsible in a large measure for the successful operation of the power cylinders and in this respect the passages 64 and 66 make an important contribution. The reservoir is provided with a partition plate 25 so that liquid on one side of the plate will be supplied to one power cylinder, whereas the liquid on the opposite side of the plate will be supplied to the other cylinder. As shown in Figure 3, each cylinder has an oil passage, such as 64, formed in the wall thereof and which passage is located forwardly of the piston thereof when the said piston is located in its most forward position. In other words, when the pistons are inoperative, the channel 65 surrounding the piston rod of said piston is constantly in communication with its particular reservoir. In addition to the oil passage 64 the wall of each cylinder is also provided with a fluid release opening 66 which is located just rearwardly of the flexible cup for its particular piston. The approximate size of this fluid release opening 66 is one-sixty-fourth of an inch. Accordingly, when the pistons are inoperative, being located in their most forward positions, it will be understood that the power cylinders are in direct communication with their respective reservoir through the opening 66 and the channel space forward of each piston is also in direct communication with a reservoir as a result of the openings 64. When the pistons are moved rearwardly openings 66 are immediately cut off and thus this motion of the pistons will function to compress the hydraulic fluid in the conduits to thus transmit a pressure to the brake systems. On forward return movement of the pistons, the fact that the channel spaces 65 contain oil is additional assurance that the respective brake systems will be maintained full of the hydraulic medium at all times. Further, in the event of a fluid leak taking place in either system the reservoir will maintain a safe fluid level to guarantee proper operation of the remaining unimpaired power cylinder and its related conduit and brake system.

Referring to the modification of Figures 4, 5 and 6, the numeral 70 indicates a dual power cylinder such as described in connection with Figures 2 and 3, the same having hydraulic connection through conduit 11 with the hydraulic brakes of the front wheels 12 and having hydraulic connection through a second conduit, namely, 13, with the hydraulic brakes of the rear wheels 14. The dual power cylinder unit is actuated by the operator through the foot pedal 15 in a manner as described since the operating pedal and shaft 15, 16 is suitably connected to the pistons of said unit by the extending stud 18. The casting for the dual power cylinder unit provides a power cylinder 71 and a power cylinder 72, the said cylinders being located relatively close together in side by side relation and having associated therewith the reservoir 73 which continuously supplies both power cylinders with an hydraulic fluid. The cap 74 is removable for replenishing the oil or other fluid comprising the hydraulic medium and the reservoir is divided into two independent sections by means of the partition 75 which has a cutaway portion such as 76 adjacent the cap.

A piston 78 is located within power cylinder 71, the said piston being mounted for free reciprocating movement within the cylinder, and said piston, or what may be described as its piston rod, is sealed with respect to the cylinder by a sealing ring 80. The ring is preferably carried by the piston at its forward end and thus is reciprocable within its cylinder. For adequate sealing purposes the ring 80 may be formed of any suitable material such as will seal this forward end of the cylinder unit against the leakage of hydraulic fluid while permitting free movement of the piston. The rear end of piston 78 has suitably fixed thereto the flexible cup 81 which likewise may be formed of any flexible sealing material and it will be observed that said cup additionally provides a seat for one end of the coil spring 82 which is positioned at its other end by the slotted member 83. This rear end of the power cylinder is sealed by means of washer 84 which supports the spring seat member 83 and is retained in place by means of the threaded closure member 85 to which conduit 11 is releasably secured by means of the nipple 86.

The piston 88, having location within power cylinder 72, is similar in construction and mode of operation to piston 78. The forward end of the piston is sealed with respect to its cylinder by means of the flexible ring washer 90 and said piston at its rear end is provided with the flexible cup 91. The spring 92 is confined between the cup and the slotted member 93, the said elements providing seats for the respective ends of the coil spring. The rear end of the power cylinder 72 is sealed by washer 94, retained in place by member 95 to which is releasably secured the nipple 96 for the conduit 13.

In this modification, the pistons 78 and 88 have coacting relation with a member 100 and 101, respectively, which essentially function as piston rods for the pistons. Said rods may be cast integrally with their pistons, or the rods may be associated therewith by means of the tongue and slot connections as shown. The extending stud 18, which is actually the operating instrumentality for the dual power cylinder unit, has suitable connections with a carriage identified in its entirety by numeral 102 and which carries a U-shaped tube 103 having leg portions 104 and 105 and which leg portions may be described as extending rearwardly toward the pistons, although terminating short of the cylinder unit. When the projection 18 is actuated by the operator through actuation of the foot pedal 15 the said projection is reciprocated and similar movement is of course applied to the carriage 102. If desired or found necessary, additional means may be provided for supporting the carriage while permitting reciprocating movements thereof and for sealing the mechanism housed by the carriage and to be presently described, it will be observed that a flexible boot or covering 107 may be provided, the same connecting with the cylinder unit at one end and with the carriage at its other end.

The piston rods 100 and 101 are suitably mounted within the leg portions 104 and 105 of the U-shaped member. In other words, the leg portions telescope the piston rods and to complete the connections between the piston rods a plurality of metal balls such as 108 are located in the U-shaped portion of the tube and thus the balls in combination with the piston rods function in the same manner as the equalizer bar of Figures 2 and 3. The springs 82 and 92 will so tension the pistons that the piston rods 100 and 101 will be yieldingly forced in a direction toward the hardened steel balls and thus all slack is eliminated, so that movement of the carriage 102 in a rearward direction toward the pistons is fully operative to produce a compression stroke of the pistons. Also any unbalancing of the pressures applied to the respective brake systems will be transmitted through the hardened steel balls and the same will be indicated by a certain degree of relative movement taking place with respect to the piston rods 100 and 101. This relative movement of the piston rods is utilized to illuminate certain signal lights to thus notify the operator of the unbalanced condition of the brake systems such as may be caused by failure of one system or the other.

Within the space between the leg portions of the U-shaped member 103 there is located a block 110 of insulating material and the leg portions securely hold said block in place. A pair of passages is provided in said block, the same being identified by numerals 111 and 112. An electric terminal 113 is located in the passage 111 and the conductor 114 for said terminal leads to the signal light 115 for the front brakes. In a similar manner terminal 116 is located in passage 112 and the conductor 117 connecting with this terminal leads to the signal light 118 for the rear brakes. The piston rods each carry an inwardly projecting pin 106 which operatively connects a switch member to the rods respectively. The switch member 120 for piston rod 100 has location in passage 111 in the insulating block 110 and thus this switch member will energize the terminal 113 upon contacting the same to illuminate the signal light 115. In a similar manner the pin 106 for the piston rod 101 operatively connects with the switch member 121 and said member is adapted to reciprocate within passage 112 for contact with terminal 116 and when contact takes place the rear signal light 118 is illuminated. Movement of the piston rods relative to the leg portions of the U-shaped member is permitted by a slot such as 122 which is formed in each leg portion and through which projects its respective pin 106.

For applying the brakes the procedure is the same as described in connection with the device of Figure 1. The pedal 15 is depressed and the carriage 102 is moved in a rearward direction considering the direction of movement of the vehicle. The operative connections between said carriage and the pistons 78 and 88, and which include the piston rods 100 and 101 and the balls 108 retained by the U-shaped member 103, are instrumental in transmitting the carriage movement to the pistons so that they are effective in applying hydraulic pressure to the brake systems. For normal operation the piston rods and pistons will move in unison. However, should an unbalanced condition occur, then one piston rod or the other will move forwardly to cause its switch member to contact its respective switch terminal and as a result the signal lights, either 115 or 118, will be illuminated, thereby notifying the driver of the vehicle that one brake system or the other has developed a leak and is not operative or at least only operative to a minor degree.

This application is a continuation-in-part of my pending application entitled Safety Mechanism for Hydraulic Braking Systems, filed August 19, 1954, and given Serial No. 450,839.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. An hydraulic system for the brakes of an automotive vehicle and the like, the combination with front and rear hydraulic brake mechanisms, of a dual power cylinder unit including a casting providing a pair of cylinders disposed in parallel and side by side relation, a conduit connecting one cylinder with the front brake mechanism, a second conduit connecting the other cylinder with the rear brake mechanism, a piston operable within each cylinder, a carriage adapted to be manually reciprocated in a direction parallel to and in alignment with the pistons, an equalizer bar pivoted to the carriage on the center line between the cylinders, a member extending forwardly from the piston of each cylinder and said members being disposed on respective sides of the equalizer bar, whereby said bar coacts with the members when the carriage is reciprocated to in turn effect reciprocation of the pistons, a first terminal fixed to the carriage and electrically connecting with a signal light for the front brake mechanism, and a second terminal also fixed to the carriage and electrically connecting with a signal light for the rear brake mechanism, said first and second terminals having location on the carriage such that an unbalanced condition of the equalizer bar will effect energization of one signal light or the other.

2. An hydraulic system for the brakes of an automotive vehicle and the like, the combination with front and rear hydraulic brake mechanism, of a dual power cylinder unit including a casting providing a pair of cylinders disposed adjacent each other in side by side relation, conduits respectively connecting the cylinders with the front and rear brake mechanisms, a piston operable within each cylinder, a carriage adapted to be manually reciprocated in a direction parallel to the pistons, an equalizer bar pivoted to the carriage, means operatively connecting the equalizer bar on the respective sides of the pivot with the pistons respectively, whereby the pistons are reciprocated in response to reciprocation of the carriage, a first and a second terminal fixed to the carriage in spaced and insulated relation, and a front and a rear signal light respectively connected to the first and second terminal, said terminals having location on the carriage and being so associated with the equalizer bar that an unbalanced condition of the equalizer bar will effect energization of one signal light or the other.

3. The combination with the hydraulic brakes of an automotive vehicle, of means for actuating said brakes including a dual power cylinder unit, said unit including a pair of cylinders disposed in parallel and side by side relation, a conduit hydraulically connecting one cylinder with the front wheel brakes of the vehicle, a second conduit connecting the other cylinder with the rear wheel brakes of the vehicle, a piston operable within each cylinder, a carriage adapted to be manually reciprocated in a direction parallel to the direction of movement of the pistons, a U-shaped tubular member carried by the carriage with the legs of the member being directed toward the cylinder unit, a piston rod projecting from each piston and extending into a leg of the member, whereby the legs of said member have telescoping relation with the piston rods, a plurality of metal balls in the U-shaped portion of the member for operatively connecting the piston rods, a first terminal fixed to the carriage and electrically connecting with a signal light for the front wheel brakes, a second terminal also fixed to the carriage and electrically connecting with a signal light for the rear wheel brakes, and switch members actuated by the piston rods, respectively, said first and second terminal having location on the carriage such that an unbalanced condition of the piston rods will effect energization of one light or the other.

4. The combination with the hydraulic brakes of an automotive vehicle, of means for actuating said brakes including a dual power cylinder unit, said unit including a pair of cylinders disposed in parallel and side by side relation, a conduit hydraulically connecting one cylinder with the front wheel brakes of the vehicle, a second conduit connecting the other cylinder with the rear wheel brakes of the vehicle, a piston operable within each cylinder, a carriage adapted to be manually reciprocated in a direction parallel to the direction of movement of the pistons, a piston rod projecting from each piston and extending to the carriage, a tubular member of arcuate formation having a fixed position on the carriage and being disposed in associated relation with the piston rods, a plurality of metal balls in the tubular member for operatively connecting the piston rods, a first terminal fixed to the carriage and electrically connecting with a signal light for the front wheel brakes, a second terminal also fixed to the carriage and electrically connecting with a signal light for the rear wheel brakes, and a switch member fixed to and actuated by each piston rod into contact with its respective terminal, said first and second terminals having location on the carriage such that an unbalanced condition of the piston rods will effect energization of one light or the other.

5. The combination with the hydraulic brakes of an automotive vehicle, of means for actuating said brakes including a dual power cylinder unit, said unit including a pair of cylinders disposed in parallel and side by side relation, a conduit hydraulically connecting one cylinder with the front wheel brakes of the vehicle, a second conduit connecting the other cylinder with the rear wheel brakes of the vehicle, a piston operable within each cylinder, a carriage adapted to be manually reciprocated in a direction parallel to the direction of movement of the pistons, a piston rod projecting from each piston and extending to the carriage, means having a position on the carriage in associated relation with the piston rods and being operable to operatively connect the piston rods, a first terminal fixed to the carriage and electrically connecting with a signal light for the front wheel brakes, a second terminal also fixed to the carriage and electrically connecting with a signal light for the rear wheel brakes, and said first and second terminals having location on the carriage such that an unbalanced condition of the piston rods will effect energization of one light or the other.

References Cited in the file of this patent
UNITED STATES PATENTS

| 2,131,459 | Wheatherhead | Sept. 27, 1938 |
| 2,353,304 | Green | July 11, 1944 |
| 2,375,415 | Hollowell et al. | May 8, 1945 |
| 2,403,938 | Macan | July 16, 1946 |
| 2,694,191 | Flanga et al. | Nov. 9, 1954 |
| 2,774,958 | Aldasoro | Dec. 18, 1956 |